United States Patent Office 3,639,665
Patented Feb. 1, 1972

3,639,665
PROCESS OF PREPARING A GELLABLE
COLLODIAL CELLULOSE SULFATE
Richard G. Schweiger, Muscatine, Iowa, assignor to
Kelco Company, San Diego, Calif.
No Drawing. Continuation-in-part of application Ser. No. 467,738, June 28, 1965, which is a continuation-in-part of abandoned application Ser. No. 347,351, Feb. 26, 1964. This application Apr. 10, 1969, Ser. No. 815,187
The portion of the term of the patent subsequent to Nov. 30, 1988, has been disclaimed
Int. Cl. C08b 5/14
U.S. Cl. 260—215
13 Claims

ABSTRACT OF THE DISCLOSURE

Process for preparing cellulose sulfate having a degree of substitution ranging from 1 to 3, preferably 2 to 3 and a viscosity in a 1% aqueous solution in excess of 20 cps., the process comprising presoaking the cellulose in a lower N-dialkyl amide for at least about 10 minutes at a temperature of about 0 to 25° C. and then reacting the presoaked cellulose with a lower N-dialkyl amide-sulfur trioxide complex for about 20 to 60 minutes at temperatures of about 0 to 35° C. Presoaking of the cellulose is carried out under agitation and the cellulose may contain up to about 10% by weight of water.

This application is a continuation-in-part of my application entitled Process of Preparing Cellulose Sulfate and Product Thereof filed June 28, 1965, Ser. No. 467,738, which is a continuation-in-part of my earlier application Ser. No. 347,351 filed Feb. 26, 1964, and now abandoned.

This invention relates to a method of preparing colloidal cellulose sulfates and particularly cellulose sulfates that are useful for preparing thermo-reversible aqueous gels in the presence of potassium ions.

Sulfate esters of cellulose have been prepared by a number of methods described in the literature. These methods all suffer from various disadvantages. For example, many of the methods which have been described lead to a substantial degree of degradation. That is, depolymerization of the cellulose takes place during the process of esterification, so that while a sulfate ester is produced, its molecular weight is not nearly as high as would have been the case had not degradation taken place. This leads to products which are not applicable for many purposes, especially in uses which depend upon gel formation and the colloidal nature of the sulfate ester and of its salts.

Again, other methods have been proposed which are carried out in the presence of tertiary amines, such as triethylamine, pyridine, and the like. However, the resulting esters are in the form of an organic salt such as a pyridinium salt, which must be removed and substituted by sodium or hydrogen, for example, in order to obtain the ultimately desired product, and incidentally to obviate the consumption of a relatively expensive organic chemical. Besides, most methods do not provide for a relatively high degree of substitution (D.S.), whereas for many applications the most useful sulfate esters are those which have a degree of substitution between 1.0 and 3.0.

An object of the present invention is to provide a process for producing sulfate esters of cellulose in which the cellulose remains relatively undegraded. Thus, the end product exhibits colloidal properties with a desired degree of substitution, and an ultimately desirable salt or free acid may be obtained with a minimum expenditure of materials and processing.

It is a further and important object of this invention to provide colloidal cellulose sulfates suitable for forming thermo-reversible aqueous gels with certain cations and a method of preparing such sulfates.

Further objects of the invention will appear as the description thereof proceeds.

Generally speaking, and in accordance with illustrative embodiments of my invention, I form a complex of sulfur trioxide and a lower N-dialkyl amide, and use this as a sulfating reagent for cellulose which has been activated prior to the sulfation reaction by treatment in a suitable manner with at least an equal weight of the same lower N-dialkyl amide.

As the N-dialkyl amide, I prefer and find best dimethyl formamide, although I may also use diethyl formamide, dimethyl acetamide, diethyl acetamide, dimethyl propionamide, and 1-methyl-2-pyrrolidinone.

The admixture of the cellulose with a diluent and preferably with the N-dialkyl amide used in preparing the complex, preferably dimethyl formamide, facilitates recovery of the said diluent following the reaction. A prior admixture of the cellulose with such a diluent minimizes heat problems and minimizes degradation at the time the cellulose is contacted with the reaction complex.

In preparing the reaction complex at least one mole of the N-dialkyl amide, such as dimethyl formamide, should be present for each mole of sulphur trioxide and preferably two moles of the N-dialkyl amide. In attempting to carry out the reaction between cellulose and such a complex having only equal molar proportions of ingredients in the complex a problem arises in providing contact between the reacting ingredients in that said materials would be substantially in the solid state. Thus, an excess of the N-dialkyl amide in the complex is desired and preferably in addition thereto premixing of the cellulose with at least an equal amount by weight of the N-dialkyl amide used in preparing the complex. It is an advantage to use the same N-dialkyl amide as the diluent for the cellulose that is used in preparing the sulfating complex in accordance with my invention since this simplifies the recovery of the diluent after completion of the sulfation reaction.

An excess of lower N-dialkyl amide in the complex forms a pourable mixture having a still further advantage of giving assistance in heat control during the sulfating step. The N-dialkyl amide, for example dimethyl formamide or other diluent admixed with the cellulose prior to the sulfating step, should be used in an amount in the range of about one to ten times the weight of the cellulose. Thus, for example, with 100 g. of cellulose I may use from 100 to 1000 g. of dimethyl formamide. Although larger amounts of diluent are not precluded they are not required.

The $SO_3$-N-dialkyl amide complex at a molar ratio of 1 to 1 should be present in the reaction mixture in an amount which is one to eight times the weight of the cellulose—larger amounts are not precluded but would be wasteful. In general, it is desirable to use at least two times the weight of the cellulose of such a complex.

Any available form of cellulose may be used, and the choice thereof will in general be determined by the purity and nature of the product desired. Thus, long fiber cotton gives the choicest product, but is relatively expensive. Chemically treated cotton linters are a preferred source of cellulose, a further and adequate source of cellulose is cellulose derived from wood. Even ground wood can be used, particularly those varieties relatively rich in cellulose and relatively poor in lignin and other constituents, although use of these materials generally leads to a relatively low grade product. The word cellulose as used herein and in the appended claims includes cellulose from various sources and in the foregoing forms.

I find that in general a reaction temperature of about 0° C. to about 35° C. is suitable, and preferably below about 30° C. The reaction time required for complete sulfation in accord with my improved process ranges from about 20 minutes up to about one hour depending on the reaction temperature employed and the relative concentrations of the reactants in the reaction mixture.

The product which is obtained immediately following the esterification may be neutralized by adding the calculated amount of aqueous solutions of an alkali metal or ammonium hydroxide, carbonate or bicarbonate. The resulting neutralized product may be precipitated therefrom by alcohols, acetone or other water miscible solvents.

If desired, the free ester may be separated by precipitation with acetone or alcohol or other like solvent, whereupon the precipitate is dissolved in water and subsequently neutralized with the alkali as just described.

It will, of course, be understood that the esters contemplated are half esters of sulfuric acid, so that one of the hydrogen ions originally present in the sulfuric acid is still free to react to give salts. Thus, in the case of the sodium cellulose sulfate ester which I may prepare in accordance with my invention, one of the valencies of the sulfuric acid is esterified with a hydroxyl group of the cellulose, and the other is neutralized by salt formation with a sodium ion.

In view of the chemical substitution of cellulose, a maximum degree of substitution (D.S.) of 3.0 is possible. In general, cellulose sulfate esters prepared according to the above procedure have a D.S. ranging from 1 to 3 and preferably about 2 to 3. The viscosities of these products, when measured at a 1% concentration in aqueous media, are generally in excess of 20 cps. and many of these products have viscosities in excess of 100 cps. Such viscosities are measured with a Brookfield Synchro Electric Viscometer, Model LVF, at a spindle speed of 60 r.p.m. and a temperature of 25° C.

In accord with the present invention, I have found that presoaking of the cellulose reactant in a lower N-dialkyl amide, as previously defined, greatly improves the sulfation reaction and the properties of the sulfated cellulose product which is obtained. The quantity of lower N-dialkyl amide used for presoaking is about one to ten times the weight of the cellulose. Preferably, the cellulose reactant is presoaked in dimethyl formamide and the sulfation complex is a complex of dimethyl formamide with sulfur trioxide, as previously described. Presoaking of the cellulose reactant increases the speed of the subsequent sulfation reaction such that relatively complete sulfation may be attained in about 20 to 60 minutes. Also, the presoaked cellulose may be sulfated at a low temperature such as 10 to 30° C. and the cellulose sulfate product may be isolated in a relatively undegraded condition such that it provides a much higher viscosity in an aqueous media than cellulose sulfates of the prior art.

In presoaking the cellulose reactant, according to the present invention, I employ a soaking time of at least about 10 minutes at a temperature ranging from about 0 to about 25° C. in order to provide sufficient activation of the cellulose reactant. Soaking times in excess of about 60 minutes at about 0 to 25° C. do not provide any appreciable increase in the degree of substitution or the weight percent of water soluble product which is recovered.

An unexpected benefit of my invention is the fact that it permits the use of undried cellulose as a reactant which contains up to about 10% by weight of water. Previously, it was found that the presence of moisture in the cellulose reactant resulted in the formation of sulfuric acid when the moisture contacted the sulfation complex. The acid then attacked the cellulose polymer structure and resulted in degradation of the cellulose sulfate product.

In accord with the present invention, I am able to achieve sulfation of the cellulose while using very mild reaction conditions and short reaction times due to the presoaking the cellulose for about 10 to about 30 minutes at about 0 to about 25° C. in a lower N-dialkyl amide—preferably dimethyl formamide. Under these conditions, sulfation of the cellulose is achieved without any appreciable degradation of its polymeric structure—even in the case of cellulose containing up to about 10 percent by weight of moisture.

A further advantage of the method of the present invention is that presoaking of the cellulose in the above described manner provides a reaction mixture that breaks up into a finely divided state which is easy to stir. This simplifies the equipment requirements for carrying out the reaction. Without sufficient presoaking of the cellulose, the reaction mixture assumes a viscous doughy consistency that requires a heavy duty mixer. The viscous, doughy mixture previously obtained in the absence of sufficient presoaking imposed a limitation on the batch size. In stirring the reaction mass, considerable heat was generated and to control the generation of heat due to mixing and to provide for sufficient cooling, it was previously necessary to use a smaller batch size.

A fairly important variable in my process involves the degree of drying to which the cellulose reactant is subjected prior to its presoaking, as described above. Drying has an adverse effect upon the reactivity of the cellulose in my sulfation process. When the cellulose has been dried at a temperature in the order of 105° C. to 110° C., I have found that presoaking of the cellulose in a lower N-dialkyl amide, preferably dimethyl formamide, as described above, results in essentially restoring the reactivity of the cellulose for use in the sulfation reaction of my invention. However, if the cellulose has previously been subjected to higher drying temperatures in the order of 120° C. and above, this results in slowing down the activation procedure by requiring an unduly long presoaking of the cellulose. Thus, in the performance of my invention, it is preferable that the cellulose be dried at a temperature in the order of about 110° C. or less.

In order to further illustrate the process of my invention, there are presented the following examples in which all parts and percentages are by weight unless otherwise indicated.

EXAMPLE I

A number of experiments were carried out to determine the effect of presoaking of the cellulose reactant on the characteristics of the sodium cellulose sulfate product produced by my process. The cellulose reactant was presoaked for various time intervals in three times its weight of dimethyl formamide after which there was added a dimethyl formamide-sulfur trioxide complex. Following addition of the complex, the sulfation reaction was carried out at various time intervals ranging from 20 to 60 minutes to determine the correlation between soaking time and reaction time in determining the characteristics of the sodium cellulose sulfate product.

In conducting the various experiments set forth in the following tables, 87 grams of ether grade cotton linters were dried at 105° C. for one-half hour during which time the weight loss was 6.0 grams. To the 81 grams of dried linters was added 244 grams (260 mls.) of anhydrous dimethyl formamide after which the mixture was charged to a 2-liter jacketed mixer equipped with Sigma blade agitation. The mixture of cotton linters in dimethyl formamide was agitated in the jacketed mixer during the presoaking period.

The dimethyl formamide-sulfur trioxide sulfation complex was prepared by dropwise addition of 144 grams (75 mls.) of sulfur trioxide to 304 grams (322 mls.) of anhydrous dimethyl formamide. During the addition, the temperature was maintained below about 25° C. The dimethyl formamide-sulfur trioxide slurry was then cooled to 0° C. and added in one portion to the presoaked cellulose. The sulfation mixture was cooled during the reaction by circulation of an ice-acetone coolant through the jacket of the mixer. Samples of the reaction mixture were taken after reaction periods of 20, 40 and 60 minutes. The samples were dissolved in cold water, then neutralized by addition of a 50% by weight solution of sodium hydroxide, precipitated by the addition of isopropyl alcohol, and then air dried at a temperature of 40 to 50° C.

As shown in the following Table I, the effect of soaking time and reaction time were determined with respect to the weight percent of the resulting sodium cellulose sulfate product which was water soluble. Cellulose is not water soluble whereas the sodium cellulose sulfate product is water soluble. The percentage of water soluble product, therefore, indicates the degree of completion of the sulfation reaction. The percentage of water soluble product was determined by filtering 100 grams of a 1% aqueous solution of the product through a dried tared filter paper and determining the weight of the insoluble residue after redrying. The weight of the water soluble product was taken as the difference between the weight of the sample and the weight of the unsoluble material collected on the filter paper.

TABLE I

Soaking Time in DMF at 25° C. vs. Percent Soluble Product Isolated

| Soaking time (minutes) | Weight percent soluble product after— | | |
|---|---|---|---|
| | 20 min. reaction time | 40 min. reaction time | 60 min. reaction time |
| 0 | 8 | 8 | 20 |
| 5 | 44 | 55 | 65 |
| 10 | 70 | 79 | 83 |
| 30 | 79 | 82 | 88 |
| 60 | 71 | 92 | 92 |

As shown in Table I, it was found that a soaking time of at least about 10 minutes was required in order to produce a relatively high weight percentage of the water soluble sodium cellulose sulfate product. It was found in further experiments that soaking times in excess of 60 minutes do not give a consistent increase in the percentage of water soluble product obtained at a reaction time of 60 minutes. Longer soaking times did, however, increase, somewhat, the yield of soluble product at shorter reaction times. For example, it was found that after a soaking time of 16 hours in dimethyl formamide at 25° C., a 15 minute reaction time under the conditions set forth above produced a product containing 86% by weight of water soluble sodium cellulose sulfate.

In a further experiment, the procedure set forth in Table I was repeated with the exception that the cellulose was soaked for 10 minutes in dimethyl formamide with agitation at a temperature of about 8 to 10° C. This material was then sulfated in the manner set forth above. A reaction time of 20 minutes produced 55% by weight of soluble product; a reaction time of 40 minutes produced 59% by weight of soluble product, a reaction time of 60 minutes produced 68% by weight of water soluble product.

In further experiments, as shown in the following Table II, the soaking time in dimethyl formamide at 25° C. and the duration of the sulfation reaction in minutes were correlated in terms of their effect on the degree of sulfate substitution (D.S.) of the resultant sodium cellulose sulfate product. In determining the degree of substitution, the samples of the product were redissolved or suspended in water, thereafter precipitated by the addition of isopropyl alcohol, and then dried. A portion of the product was then refluxed overnight in admixture with a solution containing 3.7% by weight of hydrochloric acid in water. Following the refluxing, the sulfuric acid produced therefrom was precipitated as barium sulfate by the addition of barium chloride. The barium sulfate was weighed and the degree of substitution (D.S.) was calculated from the weight of barium sulfate. This is a fairly standard analytical procedure for sulfate determination.

TABLE II

Effect of Soaking Time in DMF at 25° C. on the D.S. of the Cellulose Sulfate Product

| Soaking time (minutes) | Degree of substitution after— | | |
|---|---|---|---|
| | 20 min. reaction time | 40 min. reaction time | 60 min. reaction time |
| 0 | 1.0 | 0.8 | 0.9 |
| 10 | 1.6 | 1.8 | 1.9 |
| 30 | 1.9 | 2.0 | 2.1 |
| 60 | 1.8 | 2.2 | 2.3 |

As shown in Table II, when the cellulose was not presoaked, there was essentially no increase in the average degree of sulfation due to increased reaction time. The degree of substitution obtained with reaction times of 20, 40 and 60 minutes were within the degree of experimental error which is ±0.1 D.S. units. Further, as shown in the table, the maximum effect of presoaking was achieved after a reaction time of about 1 hour since the degree of substitution was increased only slightly in going from a reaction time of 40 minutes to a reaction time of 60 minutes.

In a further experiment conducted in the same manner as in Table II, the cellulose reactant was presoaked for ten minutes in dimethyl formamide at a temperature of about 8 to 10° C. Following this, the cellulose was then sulfated. After a reaction time of 20 minutes, the degree of substitution was 1.4, with a reaction time of 40 minutes the degree of substitution was 1.6 and with a reaction time of 60 minutes, the degree of substitution was 1.7.

In still further experiments, the effect of soaking time and reaction time were determined with respect to the average viscosity obtained by dissolving 1 gram of the sodium cellulose sulfate product in 99 grams of water. The solution was filtered to remove any insoluble material and the viscosity of the filtrate in centipoises (cps.) was measured at 25° C. using a Brookfield Viscometer Model LVF, having a spindle speed of 60 r.p.m.

TABLE III

Effect of Soaking Time in DMF at 25° C. on the Average Viscosity of the Sodium Cellulose Sulfate (SCS) Product

| Soaking time (minutes) | 1% viscosity of SCS product (cps.) after— | | |
|---|---|---|---|
| | 20 min. reaction time | 40 min. reaction time | 60 min. reaction time |
| 0 | 10 | 10 | 10 |
| 5 | 10 | 20 | 60 |
| 10 | 115 | 200 | 250 |
| 20 | 230 | 260 | 290 |
| 60 | 250 | 340 | 360 |

In a further experiment, the cellulose reactant was soaked in dimethyl formamide in the manner described above for 10 minutes at a temperature of 8–10° C. and was thereafter sulfated according to my process. The average viscosity of the sodium cellulose sulfate product after a reaction time of 20 minutes was 120 cps., after a reaction time of 40 minutes was 94 cps., and after a reaction time of 60 minutes was 180 cps. As demonstrated by both this experiment and the data in Table III, a soaking time of at least about 10 minutes is required in order to obtain a high viscosity sodium cellulose sulfate product in a short reaction time.

EXAMPLE II 91 grams of ether grade cotton linters were dried at 105° C. for 1½ hours after which there was added 243 grams (258 mls.) of dimethyl formamide which had been cooled to a temperature of 0 to 5° C. The mixture was then agitated for one hour at a temperature of 8 to 10° C. under nitrogen. A 40-gram sample of the dimethyl formamide-cotton mixture was then taken after 1 hour and analysis of the dimethyl formamide by gas-liquid chromatography showed that the mixture contained 0.57% water.

A dimethyl formamide-sulfur trioxide complex was prepared by dropwise addition of 144 grams (75 mls.) of sulfur trioxide to 304 grams (322 mls.) of dimethyl formamide at a temperature of 0–20° C. During the addition, the dimethyl formamide was contained in a glass reaction vessel which was protected from absorption of atmospheric moisture by calcium sulfate drying tubes. After preparation of the sulfation complex, the complex was added in one portion to the dimethyl formamide-cellulose mixture. Following addition, the reaction temperature rose quickly to 15° C. and then dropped slowly to 10° C. within about one hour. After a reaction time of about one hour, 215 grams of sodium bicarbonate was added in one portion followed by the addition of 150 mls. of water which was added as a fine spray. After stirring for about 30 minutes, the mixture was dissolved in 5700 mls. of water and the sodium cellulose sulfate product was precipitated by the addition thereto of 6500 mls. of methyl alcohol. The product was washed with 100 mls. of ethanol and was then dried overnight at a temperature of 45° to 55° C. The white fibrous sodium cellulose sulfate product weighed 228 grams and had a viscosity at a concentration of 1% in aqueous solution of 293 cps. The degree of substitution of the product was determined to be 2.3.

As demonstrated by Example II, the cellulose may be suitably activated by presoaking in cold dimethyl formamide having a temperature of about 0° C. This is quite advantageous since it permits the use of the presoaked cellulose in the subsequent sulfation reaction without additional precooling of the cellulose reactant prior to addition of the sulfation complex. If, for example, it were necessary to presoak the cellulose reactant at a higher temperature, such as 50° or 60° C., it would be necessary to cool the cellulose prior to addition of the sulfation complex. This would not only be expensive but, in addition, would slow down the overall process due to the time required to cool the presoaked cellulose reactant.

EXAMPLE III

In utilizing my process for sulfation of cellulose which contained water, 98 grams of ether grade cotton linters were mixed with 285 grams (300 mls.) of dry dimethyl formamide. The mixture was agitated for 1 hour at an ambient temperature of 25° C. and was thereafter cooled to 10° C. over a period of one-half hour. An analysis of of a 41 gram sample showed that the mixture of cellulose and dimethyl formamide contained about 2.4% by weight of water, which corresponds to a water content in the cellulose of 9.8% by weight. Following presoaking of the cellulose, the dimethyl formamide-sulfur trioxide complex, prepared in the manner set forth in Example II, was cooled to −3° C. and added in one portion to the mixture of cellulose and dimethyl formamide. After about 5 minutes, the temperature rose to 26° C. and then gradually dropped to 10° C. in about 30 minutes. After a reaction time of one hour, 212 grams of sodium bicarbonate was added in one portion followed by 150 mls. of water. Stirring was continued for 15 minutes after which the mixture was dissolved in 5500 mls. of water and the sodium cellulose sulfate product was precipitated by the addition of 3500 mls. of isopropyl alcohol. The product was then dried and was found to weigh 211.5 grams. A 1% aqueous solution of the product had a viscosity at 25° C., as measured by a Brookfield Viscometer, Model LVF, at 60 r.p.m. of 307 cps. The degree of substitution of the product was determined in the manner described previously and found to be 2.3.

Having fully defined my invention in the foregoing specification, I desire that my invention be limited only by the lawful scope of the appended claims.

What is claimed is:

1. Process for preparing a water soluble cellulose sulfate having a degree of substitution ranging from 1 to 3 and a viscosity in a 1% aqueous solution of about 20 cps. or more, said cellulose sulfate being capable of forming a thermoreversible gel in the presence of potassium ions, said process comprising:

presoaking the cellulose reactant in a lower N-dialkyl amide for at least about 10 minutes at a temperature ranging from about 0 to about 25° C., and thereafter reacting said presoaked cellulose with a sulfur trioxide-lower N-dialkyl amide complex at a temperature ranging from about 0 up to about 30° C. for a time period of about 20 minutes to about 1 hour until said cellulose is sulfated to a degree of substitution ranging from 1 to 3.

2. The process of claim 1 wherein said lower N-dialkyl amide is dimethyl formamide.

3. The process of claim 1 wherein said cellulose is presoaked for about 10 to about 60 minutes.

4. The process of claim 1 wherein said cellulose is presoaked for about 10 to about 30 minutes.

5. The process of claim 1 wherein said cellulose is sulfated to a degree of substitution ranging from about 2 to 3.

6. The process of claim 1 wherein said cellulose reactant contains water in an amount up to about 10% by weight of said cellulose.

7. The process of claim 2 wherein said cellulose reactant contains water in an amount up to about 10% by weight of said cellulose.

8. The process of claim 1 wherein said cellulose reactant has been predried at a temperature in the order of about 110° C., or less.

9. The process of claim 2 wherein said cellulose has been predried at a temperature in the order of about 110° C., or less.

10. The process of claim 1 wherein said complex is employed in stoichiometric excess with respect to said cellulose.

11. A process for preparing a water-soluble cellulose sulfate having a degree of substitution ranging from 1 to 3 and a viscosity in a 1% aqueous solution of about 20 cps. or more, and said cellulose sulfate being capable of forming a thermoreversible gel in the presence of potassium ions, said process comprising:

presoaking the cellulose reactant in a lower N-dialkyl amide for at least about 10 minutes, and thereafter reacting said presoaked cellulose with a sulfur trioxide-lower N-dialkyl amide complex at a temperature ranging from about 0 up to about 35° C. for a time period of at least about 20 minutes until said cellulose is sulfated to a degree of substitution ranging from 1 to 3.

12. The process of claim 11 wherein said lower N-dialkyl amide is dimethyl formamide.

13. The process of claim 11 wherein said cellulose is sulfated to a degree of substitution ranging from about 2 to 3.

References Cited

UNITED STATES PATENTS

| | | | |
|---|---|---|---|
| 2,697,093 | 12/1954 | Jones | 260—215 |
| 2,705,710 | 4/1955 | Blume | 260—229 |
| 3,057,855 | 10/1962 | Smith et al. | 260—233.5 |
| 3,070,595 | 12/1962 | Petracek et al. | 260—233.5 |
| 3,077,373 | 2/1963 | Kerr | 260—233.5 |
| 3,200,110 | 8/1965 | Gollin et al. | 260—210 |
| 3,349,078 | 10/1967 | Schweiger | 260—209.6 |

DONALD E. CZAJA, Primary Examiner

R. W. GRIFFIN, Assistant Examiner